United States Patent [19]

Ishitoya et al.

[11] Patent Number: 4,974,222
[45] Date of Patent: Nov. 27, 1990

[54] SLIDER-POSITION DETECTOR FOR DETECTING THE POSITION OF THE SLIDER OF A DISK PLAYER

[75] Inventors: Koichi Ishitoya; Akihiko Tagawa, both of Tokorozawa, Japan

[73] Assignee: Pioneer Electronic Corporation, Tokyo, Japan

[21] Appl. No.: 417,195

[22] Filed: Oct. 4, 1989

[30] Foreign Application Priority Data

Feb. 21, 1989 [JP] Japan .................................. 1-41414

[51] Int. Cl.⁵ ...................... G11B 17/30; G11B 17/00
[52] U.S. Cl. .................................. 369/215; 369/219; 369/244
[58] Field of Search ................. 369/219, 215, 244, 79, 369/233, 133

[56] References Cited

U.S. PATENT DOCUMENTS

| 4,527,265 | 7/1985 | D'Alayer De Costemore ... 369/215 |
| 4,574,372 | 3/1986 | D'Alayer De Costemore ... 369/215 |
| 4,613,962 | 9/1986 | Inoue et al. ........................ 369/219 |
| 4,664,218 | 5/1987 | Graham et al. ..................... 180/272 |
| 4,706,234 | 11/1987 | Okada ................................ 369/244 |

FOREIGN PATENT DOCUMENTS

| 0295281 | 12/1987 | Japan .................................. 369/244 |
| 8809552 | 12/1988 | World Int. Prop. O. ........... 369/244 |

Primary Examiner—Stuart S. Levy
Assistant Examiner—Kenneth B. Wells
Attorney, Agent, or Firm—Fleit, Jacobson, Cohn, Price, Holman & Stern

[57] ABSTRACT

A slider-position detector for a disk player having a slider whose friction coefficient is low on a guide rail and for carrying a pickup and capable of moving in radial direction of a disk, which detector comprises a locking mechanism for locking the slider in accordance with a locking signal, and controller for providing a locking signal to the locking mechanism while the disk player is in a stop mode. The controller further detects the movement of the slider and causes the locking to lock the slider only upon the detection of movement of the slider while the disk player is in the stop mode. While reducing unwanted operating noises, the slider-position detector is capable of surely detecting the position of the slider easily moved due to external vibrations.

9 Claims, 3 Drawing Sheets

SLIDER-POSITION DETECTOR FOR DETECTING THE POSITION OF THE SLIDER OF A DISK PLAYER

BACKGROUND OF THE INVENTION

1. Field of the Invention

The present invention relates to a slider-position detector for detecting the position of the slider of a disk player.

2. Description of the Prior Art

In a disk player for playing an information recording disk (hereinafter referred to simply as "disk") such as a video disk, a digital audio disk, etc., a slider carrying a pickup is linearly moved in the radial direction of a disk. The slider is driven by a rotary motor through a mechanical transmission. A rack-and-pinion mechanism, for example, reduces the speed of the rotary motion of the rotary motor and converts the rotary motion into a linear motion to drive the slider for a linear motion.

The speed of the searching operation of the slider with the pickup, namely, an operation for searching a disk for a desired recording track while moving the slider at a high speed, is restricted since the response speeds of the mechanical transmission and the rotary motor are limited. Nevertheless, increase in the speed of the searching operation has been strongly desired in the industry. The speed of the searching operation of the slider may be increased by using a linear motor which has excellent response characteristics, instead of a rotary motor, as a driving source for driving the slider for a linear motion.

The friction coefficient between the slider using the linear motor and the guide rail is smaller than that using the conventional combination of the rotary motor and the rack-and-pinion mechanism, although the disk player is usually put on a stationary place. In the disk player employing the slider driven by the linear motor, the slider is liable to be accidentally moved due to external vibrations, in the stop mode. Therefore, the slider is shifted from a position to be stopped in the stop mode when the external vibrations acts on the disk player. In this case, the next movement of the slider is not smoothly executed.

SUMMARY OF THE INVENTION

Accordingly, an object of the present invention is to provide a slider-position detector for detecting the position of a slider using the low friction coefficient between the slider and the guide rail, and being capable of accurately detecting the position of the slider.

The slider-position detector according to the present invention is incorporated in a disk player which has a pickup for reading information recorded in a recording disk, a slider whose friction coefficient is low with respect to a guide rail and for carrying the pickup and capable of moving linearly in a radial direction of the disk, and driving means for moving the slider. The slider-position detector comprises: locking means for locking the slider in accordance with a locking signal; and control means for providing a locking signal to the locking means while the disk player is in a stop mode.

DETAILED DESCRIPTION OF THE PREFERRED EMBODIMENT

The embodiment according to the present invention will be explained referring to the accompanying drawings in detail.

Figure 1:
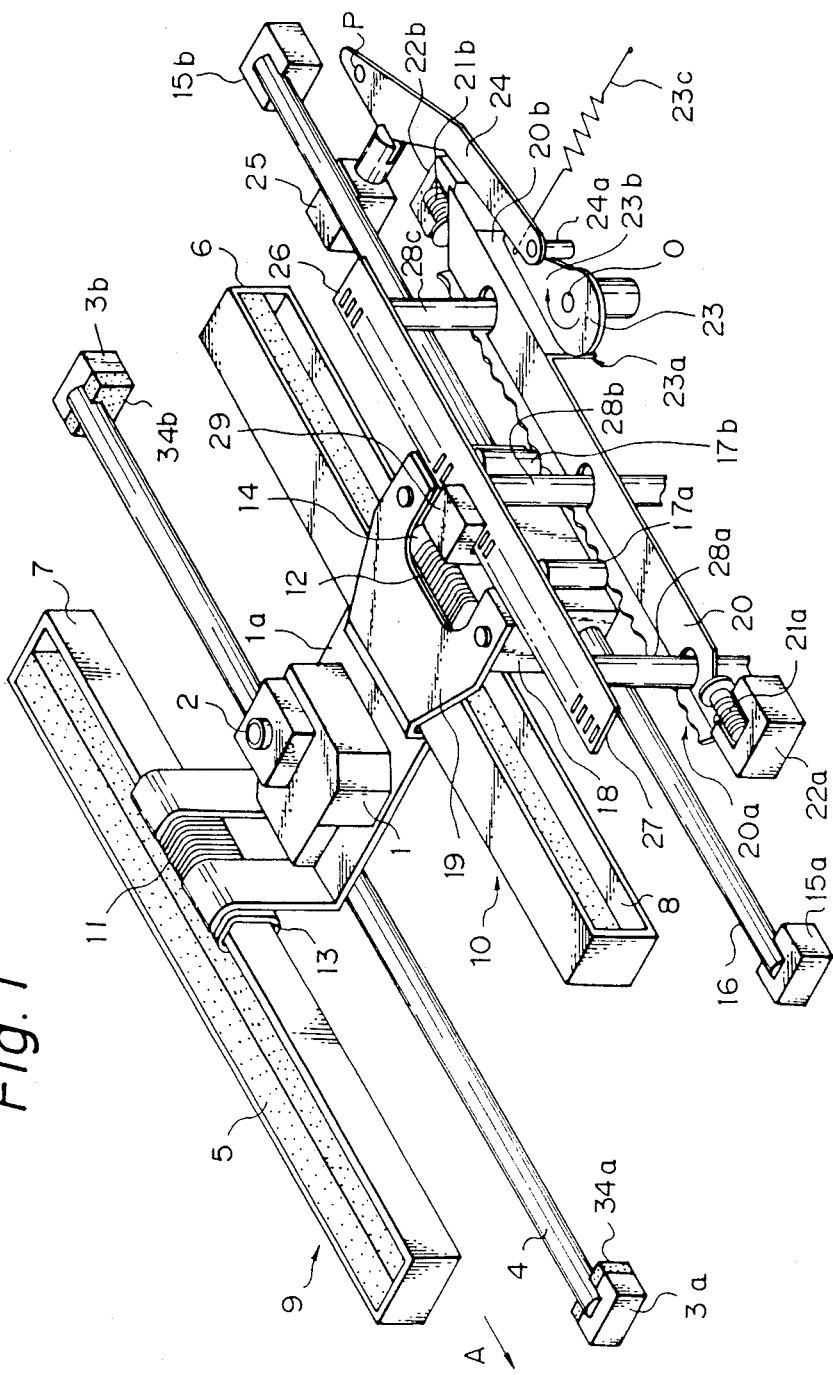
FIG. 1 is a perspective view of a slider driving mechanism incorporating a slider-position detector for detecting the position of the slider of a disk player in a preferred embodiment according to the present invention.

FIG. 1 shows a slider driving mechanism incorporating a slider-position detector for detecting the position of the slider of a disk player. The slider 1 carries an optical pickup 2 for reading information recorded in a disk, not shown. The slider 1 is guided by a straight guide rail 4 for a linear movement between the opposite ends of the guide rail 4. The slider 1 has extensions or wings 1a laterally extending perpendicularly to the guide rail 4 on the opposite sides of the rail. Cushion members 34a and 24b are attached to the respective inner surfaces of stoppers 3a and 3b to absorb the energy of collision of the slider 1 against the stoppers 3a and 3b. A pair of elongated magnetic circuits 9 and 10 are extended in parallel to the guide rail 4, respectively, on the opposite sides of the guide rail 4. The magnetic circuits 9 and 10 comprise, respectively, magnets 5 and 6 having the shape of a rectangular prism, and elongate yokes 7 and 8 having the shape of a rectangular frame. The yokes are combined, respectively, with the magnets 5 and 6 so as to form magnetic gaps in combination with the side surfaces of the corresponding magnets 5 and 6. Coil holders 13 and 14 are lapped around the respective sides of the yokes 7 and 8 so as to be movable along the sides respectively. Coils 11 and 12 are wound on the coil holders 13 and 14 respectively. The coil holders 13 and 14 carrying the coils 11 and 12 are fixed to the extensions 1a of the slider 1 respectively. Therefore, the slider 1 moves together with the coils 11 and 12. The slider 1 is driven directly for movement along the guide rail 4 by supplying predetermined driving currents to the coils 11 and 12 from a motor driving circuit, not shown. Thus, the magnetic circuits 9 and 10, and the coils 11 and 12 constitute a moving-coil linear motor.

A straight guide rail 16 is extended on the outside of the magnetic circuit 10 in parallel to the guide rail 4. The guide rail 16 is held at the opposite ends thereof on stoppers 15a and 15b. A rectangular moving block 18 has a pair of protrusions 17a and 17b on the outer surface thereof. The moving block 18 is slidably mounted on the guide rail 16 for sliding movement along the guide rail 16. A connecting arm 19 extending outward from the extension 1a of the slider 1 is fixed to the upper surface of the moving block 18 to move the moving block 18 together with the slider 1. An elongate locking plate 20 having a cross section resembling the letter "L" is extended in parallel to the guide rail 16. Teeth 20a are formed throughout at the upper edge of the upward portion of the locking plate 20 corresponding to the arm of "L". A lug 20b projects downward from the lateral portion of the locking plate 20 corresponding to the stem of "L". Pivots 21a and 21b longitudinally extending from the opposite ends of the locking plate 20 are supported rotatably in bearings 22a and 22b respectively. A cam 23 having a cam surface 23a and a nose 23b is supported for turning about an axis of rotation "O". The cam 23 is urged in the direction of an arrow, i.e., a clockwise direction, by urging means 23c. The cam surface 23a of a curve consisting of points continuously varying in distance from the axis of rotation "O" engages the outer surface of the lug 20b of the locking plate 20. The cam 23 is turned in the direction of the arrow to turn the locking plate 20 by pushing the lug 20b. A pin 24a provided on one end of a swing arm 24 engages the nose 23b of the cam 23. The swing arm 24 is caused to swing on a pivot "P" provided at the other end thereof by an actuator 25 engaging the swing arm 24 at a position between the pin 24a and the pivot "P". When the actuator 25 makes swing arm 24 swing on the pivot "P" in a clockwise direction, the pin 24a pushes the nose 23b of the cam 23 to turn the cam 23 in a counterclockwise direction. When the actuator 25 makes the swing arm 24 swing on the pivot "P" in a counterclockwise direction, the cam 23 is allowed to turn in a clockwise direction with the nose 23b following the pin 24a. The operating member of the actuator 25 is retracted while the disk player is connected to a power supply. The above components constitute a slider locking mechanism for locking the slider 1 at a selected position.

A shading plate 27 having a plurality of slits 26 in an optically identifiable pattern is extended in parallel to the guide rail 16 and is supported fixedly by three supports 28a, 28b and 28c on a chassis, not shown. A sensor 29 comprises a photocoupler having a light emitting element and a light-sensitive elements. The sensor 29 is fixed to the upper surface of the moving block 18 so that the shading plate 27 is disposed with gaps between the light emitting element and the light-sensitive element which receives lights passing through the slits 26 emitted from the light emitting element. The sensor 29 moves together with the slider 1 and generates a single pulse signal per one detection of each slit 26. The shading plate 27 and the sensor 29 constitute a pulse signal generating means which generates a pulse signal every time the slider 1 is moved through a predetermined distance, namely, a distance corresponding to the pitch of the slits 26.

Figure 2:
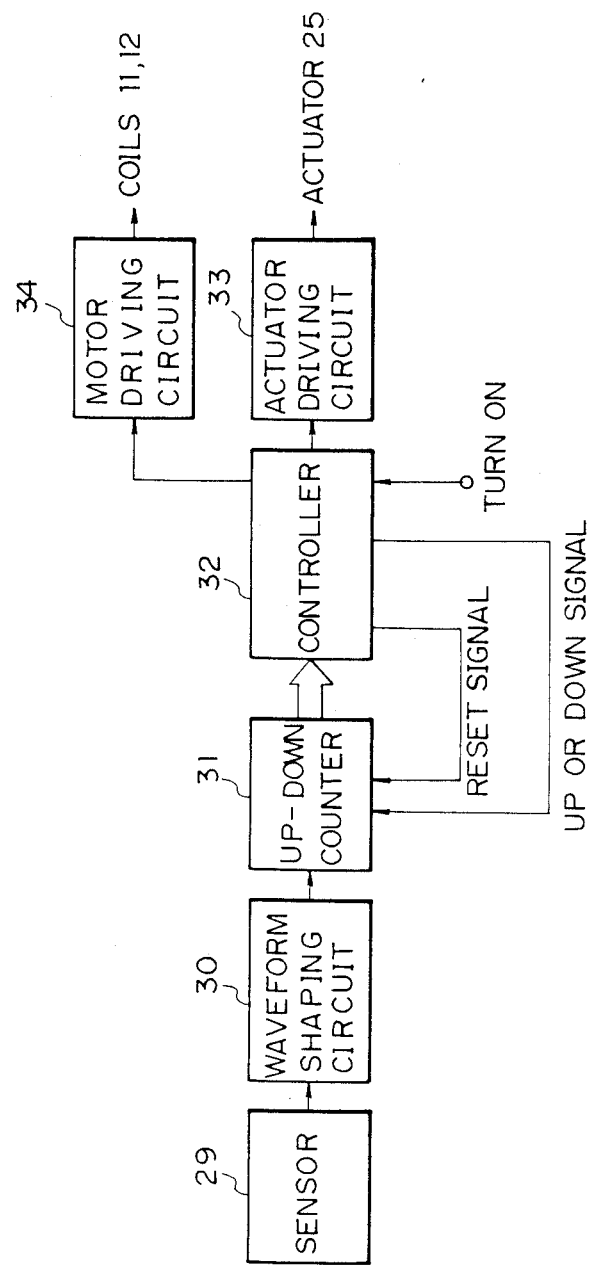
FIG. 2 is a block diagram of a control circuit for controlling the slider driving mechanism.

Referring to FIG. 2, pulse signals generated by the sensor 29 are provided to an up-down counter 31 after shaping the waveform thereof by a waveform shaping circuit 30. The up-down counter 31 counts the pulse signals and gives a value of the number of counts of the pulse signals i.e. a count value to a controller 32 as position data representing the position of the slider 1.

The controller 32 comprises a microcomputer. When the slider 1 arrives at a predetermined position such as an initial position of the disk, the controller 32 gives a reset signal to the up-down counter 31 to reset the count value of the up-down counter 31. The controller 32 then gives an up-signal or a down-signal to the up-down counter 31 according to the direction of movement of the pickup 2, namely, the normal direction or the reverse direction, in accordance with the operating mode of the disk player such as a lead-in mode, a lead-out mode, a play mode, a search mode or a scan mode. The controller 32, in accordance with its microcomputing capabilities, keeps track of the operating modes of the disk player including the above-mentioned lead-in mode, leadout mode, play mode, search mode, scan mode, as well as a stop mode in which the disk player is to be at rest. Changes in operating modes, as is well known in the art, are effected by the user according to the type of operations the user desires the disk player to perform. Also, as is well known in the art, a microprocessor, much like that embodied by controller 32, is responsive to changes in the operating mode of the disk player for controlling various internal functions. For example, the controller 32 can control the up-down counter 31 so either as to up-count correspondingly to the radially outward movement of the pickup 2 or as to down-count correspondingly to the radial inward movement of the same. The controller 32 obtains the count value counted by the up-down counter 31 and gives the count value as the position data of the pickup 2 of the slider 1 to an external circuit if necessary.

The controller 32 further controls an actuator driving circuit 33 for driving the actuator 25, and a motor driving circuit 34 for supplying currents to the coils 11 and 12 to control the slider 1. Namely, the controller 32 provides an ON or OFF signal to the actuator driving circuit 33 and the motor driving circuit 34.

The controller 32 further controls the driving circuit 33 to energize the actuator 25 of the slider locking mechanism so as to hold the plunger of the actuator 25 in a retracted position, when the power supply of the disk player is turned on. While the disk player is in a stop mode, the controller 32 monitors the count value counted by the up-down counter 31. If the count value exceeds a predetermined value, the controller 32 determines that the slider 1 which must be stationary is moved by an external disturbance such as external vibrations, and controls the driving circuit 33 to project the plunger of the actuator 25 by way of the non-energized state.

Figure 3:
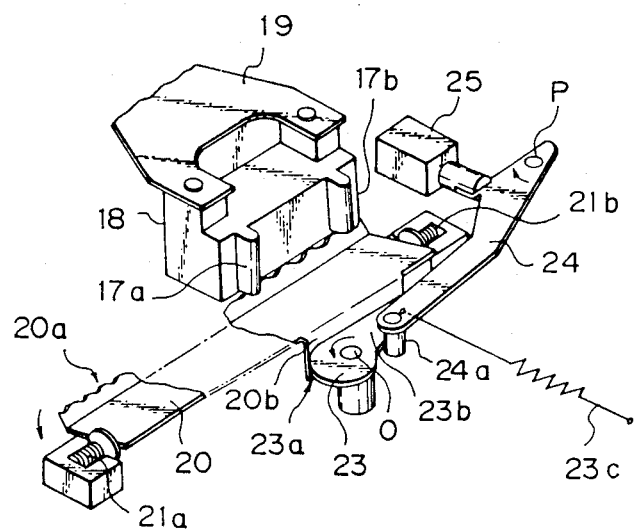
FIG. 3 is a perspective view of a slider locking mechanism in a releasing state.
Figure 4:
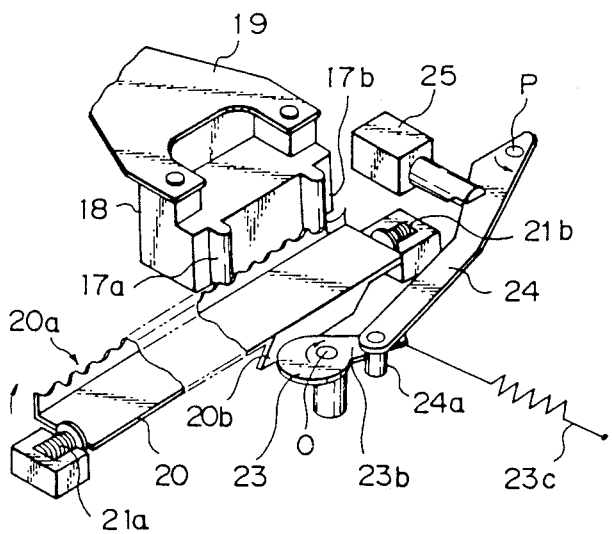
FIG. 4 is a perspective view of the slider locking mechanism of FIG. 3 in a locking state.

Functions of the slider locking mechanism will be described hereinafter with reference to FIG. 3 and 4 showing the slider locking mechanism, respectively, in a releasing state and in a locking state.

FIG. 3 shows that the plunger of the actuator 25 is energized and retracted while the disk player is connected to the power supply in the turned on state. This state is usually in a stop mode in which the disk player waits any commands. The plunger of the actuator 25 has turned the swing arm 24 clockwise to turn the cam 23 counterclockwise against a counter-force of the urging means 23c for urging the cam 23 clockwise. In this state, the lowest portion of the cam surface 23a of the cam 23 corresponding to a portion of the base circle of the cam 23 is in contact with the lug 20b of the locking plate 20, and hence the locking plate 20 is titled counterclockwise on the pivots 21a and 21b because the upward portion of the locking plate 20 is heavier than the lug 20b. As a result, the teeth 20a of the locking plate 20 move down and are separated from the protrusions 17a and 17b of the moving block 18 to allow the free movement of the moving block 18. In this state, the slider 1 is released from the locking mechanism.

On the other hand, the controller 32 controls the driving circuit 33 to project the plunger of the actuator 25, only when the controller 32 detects the displacement of the slider 1 on the basis of the output signal of the sensor 29 even while the disk player is in the stop mode, in which the slider 1 must not be driven by the controller in the released state. Consequently, the actuator 25 turns the swing arm 24 counterclockwise, and then the swing arm 24 allows the urging means 23c to turn the cam 23 clockwise as shown in FIG. 4. In this state, the highest portion of the cam surface 23a of the cam 23 engages and pushes the lug 20b of the locking plate 20 to turn the locking plate 20 clockwise. Consequently, the teeth 20a of the locking plate 20 rise and engage the protrusions 17a and 17b of the moving block 18 to lock the moving block 18, hence the slider 1 is fixedly connected to the moving block 18 in the locking state.

When the mode of the disk player is changed from the stop mode to other mode, the controller 32 controls the driving circuit 33 to release the slider 1 from the slider locking mechanism by retracting the plunger of the actuator 25. On the other hand, while the disk player is disconnected from the power supply in the turn off state, the slider locking mechanism remains automatically in the locking state because no current is supplied to the actuator 25.

Thus, the disk player according to the present invention employs the slider 1 driven by the linear motor which is liable to be moved accidentally because the friction coefficient is low between the slider and the guide rail. Such disk player is apt to suffer from an unwanted interference of an external vibrations and then the slider 1 is moved. Therefore, the position of the slider 1 is monitored even in the stop mode and the slider 1 is locked upon the detection of the displacement of the slider 1. Accordingly, the slider 1 will not be moved significantly in the stop mode, even if an external disturbance such as external vibrations acts on the disk player. As a result, the mode of the disk player can be smoothly changed from the stop mode to other mode. Furthermore, the disk player is usually put on a stationary place, the locking mechanism is therefore actuated to lock the slider 1 only when the slider 1 is moved accidentally. As a result, the repetition of the locking operation of the slider locking mechanism is restricted to the least necessary number of times. The disk player according to the present invention reduces the frequency of generation of unpleasant noises generated when the slider locking mechanism is operated within the least necessary extent. The life of the slider locking mechanism is therefore extended.

In this way, the slider locking mechanism of the foregoing embodiment is actuated to lock the slider 1 only when the slider 1 is moved while the disk player is in the stop mode, although the slider locking mechanism may be actuated usually. The slider locking mechanism of the foregoing embodiment is activated to lock the slider 1 only when the latter is inadvertently moved while the controller 32 is in the stop mode. The slider mechanism may be actuated at nay time while the controller 32 is in the stop mode.

The foregoing embodiment of the slider-position detector employs the position-detecting means which comprises the photoelectric sensor 29 as means for generating a pulse signal every time the slider 1 is moved, and the up-down counter 31 for counting the pulse signal output from the sensor 29 and providing the count value to the controller 32 which monitors the count value and determines whether or not the count value is changed. However, the position-detecting means is not limited thereto. The slider-position detector may employ the monitoring system which comprises means for monitor the counter electromotive force generated in the coils of the linear motor during the movement of the slider and means for detecting the changes of the counter electromotive force.

As is apparent from the foregoing description, the slider-position detector for detecting the position of the slider in accordance with the present invention comprises the slider carrying the pickup whose friction coefficient against the guide rail is very low and capable of moving in radial directions of the disk and is characterized in that the slider is capable of being locked in the stop mode. Accordingly, the position of the easily movable slider can surely be detected, although the external vibrations acts on the disk player.

Furthermore, the slider locking mechanism according to the present invention is actuated to lock the slider only when the slider 1 is moved while the disk player is in the stop mode. While reducing the number of times of the actuation of the locking mechanism, the frequency of generation of the operating noises therefore increases in the stop mode of the disk player.

What is claimed is:

1. A slider-position detector mounted on a disk player which has a pickup for reading information recorded in a surface of a recording disk, a slider carrying said pickup and capable of moving across the surface of said disk, guide means for defining movement of said slider, and driving means for moving said slider without contact therebetween, the friction coefficient of said slider being low with respect to said guide means, said slider-position detector comprising:
   locking means for locking said slider in accordance with a locking signal; and
   control means for providing a locking signal to said locking means and including movement detection means for detecting the movement of said slider and providing a locking signal to said locking means so as to lock said slider upon said movement detection means detecting movement of said slider while said disk player is in a stop mode.

2. A slider-position detector means to claim 1, wherein said movement-detection means has a pulse signal generating means for generating a pulse signal every time said slider is moved through a predetermined distance, an up-down counter for up-counting or down-counting the number of said pulse signals, and means for detecting the changes of the number of said pulse signals with respect to a predetermined value.

3. A slider-position detector according to claim 1, wherein said driving means is a linear motor.

4. A slider-position detector according to claim 1, wherein said guide means includes a first guide rail, and said locking means including:
   a second guide rail;
   a moving block slidably mounted on said second guide rail and connected to and movable with said slider, said moving block having engaging means on a surface thereof;
   a locking plate disposed parallel to said second guide rail and having receiving means for receiving the engaging means of said moving block for preventing movement of said moving block relative to said locking plate, said locking plate being movable between a release position whereby said receiving means is disengaged from said engaging means of said moving block and a locking position whereby said receiving means receives said engaging means;
   biasing means for biasing said locking plate in said release position; and
   actuator means for forcing said locking plate to move to said locking position.

5. A slider-position detector according to claim 4, wherein said locking plate is an elongated member and is pivotable about a longitudinal axis thereof between said release position and said locking position.

6. A slider-position detector according to claim 5, and further comprising a cam member having a cam surface and being rotatable between first and second positions relative to and in contact with said locking plate, said biasing means biasing said cam in said first position to orient said cam surface in contact with said locking plate for maintaining said locking plate in said release position, wherein said actuator means forces said cam member to rotate to said second position whereby said cam surface contacts said locking plate to cause said locking plate to pivot to said locking position for engaging said receiving means with said engaging means of moving block.

7. A slider-position detector according to claim 6, and further comprising a swing arm having one end thereof operatively associated with said actuator means, and wherein said cam member further includes a leg extension in contact with the other end of said swing arm, said actuator means including a plunger movable between an extended and a retracted position, said retracted position causing said swing arm to maintain said cam member in said first position and said extended position causing said swing arm to move said cam member to move to said second position for moving said locking plate to said locking position.

8. The slider-position detector according to claim 1, wherein said control means monitors operating modes of said disk player, said operating modes including said stop mode during which said disk player is to be at rest, said movement detection means detecting movement of said slider during said stop mode and providing said locking signal so as to lock said slider to prevent further movement of said slider resulting from external vibrations acting on the disk player while the disk player is in the stop mode, and for providing smooth transitions of said disk player from said stop mode to another one of said operating modes.

9. The slider-position detector according to claim 2, wherein said control means monitors the up-down counter, compares the value of said up-down counter with a predetermined value, and generates said locking signal when the count value exceeds said predetermined value while the disk player is in the stop mode so as to lock said slider if an external disturbance acts on the disk player during the stop mode.

* * * * *